United States Patent
Crosby et al.

(10) Patent No.: US 8,377,493 B2
(45) Date of Patent: Feb. 19, 2013

(54) METHOD FOR MAKING A ROLLED SNACK FOOD PRODUCT HAVING A LIGHT CRISPY TEXTURE

(75) Inventors: Thomas George Crosby, Frisco, TX (US); Geoffrey Thomas Ley, Dallas, TX (US); V. N. Mohan Rao, Plano, TX (US); Dianne Renee Ripberger, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 0 days.

(21) Appl. No.: 12/939,680

(22) Filed: Nov. 4, 2010

(65) Prior Publication Data

US 2011/0052777 A1     Mar. 3, 2011

Related U.S. Application Data

(62) Division of application No. 10/896,208, filed on Jul. 21, 2004, now abandoned.

(51) Int. Cl.
*A23L 1/217*     (2006.01)
(52) U.S. Cl. ........ 426/549; 426/438; 426/439; 426/553; 426/560; 426/808
(58) Field of Classification Search .......... None
See application file for complete search history.

(56) References Cited

U.S. PATENT DOCUMENTS

| | | | |
|---|---|---|---|
| 4,455,321 A | 6/1984 | Glabe et al. | |
| 5,284,667 A | 2/1994 | Zimmermann et al. | |
| 5,690,982 A | 11/1997 | Fazzolare et al. | |
| 5,780,091 A | 7/1998 | Cassetta et al. | |
| 5,814,360 A | 9/1998 | McDilda et al. | |
| 5,928,700 A * | 7/1999 | Zimmerman et al. | 426/549 |
| 5,928,701 A | 7/1999 | Jensen et al. | |
| 6,022,574 A | 2/2000 | Lanner et al. | |
| 6,136,359 A | 10/2000 | Orosa et al. | |
| 6,165,530 A | 12/2000 | Mathew et al. | |
| 2002/0168458 A1* | 11/2002 | Rodriguez et al. | 426/549 |

FOREIGN PATENT DOCUMENTS

| | | |
|---|---|---|
| EP | 0669081 | 8/1995 |
| WO | 9639865 | 12/1996 |
| WO | 9708961 | 3/1997 |
| WO | 9953769 | 10/1999 |
| WO | 0108499 | 2/2001 |

* cited by examiner

*Primary Examiner* — Lien Tran
(74) *Attorney, Agent, or Firm* — Colin P. Cahoon; Celina M. Orr; Carstens & Cahoon, LLP

(57) ABSTRACT

A method for making a cooked rolled snack food from a starch based dough. The starch based dough is admixed with a small average particle size monoglyceride. The dough is then rolled and cooked in hot oil. The fatty acid chain is disposed within the helical amylose molecules in the starch-based dough and provides structural support within the helix. This support helps control inward expansion of the rolled dough snack during frying.

21 Claims, 2 Drawing Sheets

METHOD FOR MAKING A ROLLED SNACK FOOD PRODUCT HAVING A LIGHT CRISPY TEXTURE

RELATED APPLICATION

This application is a divisional of U.S. Utility application Ser. No. 10/896,208 filed Jul. 21, 2004 now abandoned, entitled "Method for Making a Rolled Snack Food Product Having a Light Crispy Texture."

BACKGROUND OF THE INVENTION

1. Technical Field

The present invention relates to a method for making an improved rolled snack food and more particularly to a method for making a rolled snack food having a light and crispy texture.

2. Description of Related Art

Conventional tortilla snack piece products are prepared from corn masa dough made from a traditional nixtamalization process. The masa dough is then compressed between a pair of counter rotating sheeter/cutter rollers that are located closely together, thereby providing a pinch point through which the dough is formed into sheets and cut into a desired shape. Often the desired snack piece shape is that of a triangle. After the dough is cut, the snack pieces are transported towards and through a toaster oven for an increased stiffness for insertion into the fryer. The toasted snack pieces are then passed through a proofing stage where the snack pieces are exposed to ambient air to equilibrate moisture throughout the snack piece. The snack pieces are then fried in hot oil before being routed into a seasoning tumbler where flavored seasonings or salts are added to the snack pieces. The snack pieces are then sent to be packaged.

Snack pieces made from this process typically have a substantially flat geometry, even if the snack pieces have a curl as a result of the frying process. However, there are advantages for snack pieces to have to other geometries. For example, a rolled snack piece can be more easily placed into a consumer's mouth, resulting in a bite-sized or more easily consumable snack. Moreover, the bulk density of rolled snacks is higher than the bulk density of snacks having a substantially flat geometry. As a result, less packaging can be used to contain the same weight of rolled snacks. Accordingly, a need exists for a rolled snack food.

A rolled snack food can be made by rolling the cut dough pieces following sheeting before the pieces are toasted. One such apparatus for rolling pieces of dough is disclosed is U.S. Pat. No. 6,393,974. Unfortunately, texture problems that do not occur in prior art flat snack pieces arise during cooking of rolled dough pieces. For example, when prior art substantially flat snack pieces are cooked in hot oil, steam within the dough can cause the snack pieces to expand mostly outward. This outward expansion creates voids within the snack piece. These voids help create a lighter, crispier texture.

In a rolled snack piece, however, the expansion occurs radially, both inward and outward. When the rolled snack piece is placed into the fryer, the moisture in contact with the hot oil in the outer portion of the fried snack piece turns to steam causing both inward and outward radial expansion of the snack piece. The inward expansion of the rolled snack food, upon insertion into the fryer, closes off the inner portion of the rolled snack food. Thus, frying oil does not fully permeate the rolled snack piece. This inhibits oil displacement of water. Corn masa becomes hard and unpalatable at low oil levels. As a result, the inner portion of the snack piece has an undesirably hard texture. Moreover, inward radial expansion further compresses the inner portion of the snack piece which increases the particulate density, and decreases any voids that help provide a lighter, crispier texture. A higher particulate density means there are fewer voids to provide a lighter, crispier texture. As a result, a hard texture is created throughout the inner portion of the rolled snack food. Hence, a need exists for a method to control inward expansion of a rolled snack food during frying.

In addition, while the moisture content upon leaving the toast oven in a prior art substantially flat masa-based snack piece is between about 25% and about 35% moisture, the moisture content of a rolled dough snack piece, upon leaving the toast oven, is about 45% to 50% moisture. There is a larger temperature gradient within a rolled snack piece that makes it more difficult to remove water uniformly. This is due, in part, to the decreased surface area that the rolled dough has exposed in the toast oven. For example, as the rolled snack piece passes through the toast oven, the temperature of the inner part of a rolled snack piece is lower than the temperature of the outer, exposed part. This results in uneven moisture removal, and higher moisture contents near the inner portion of the rolled snack piece. As indicated above, because the inner portion of the snack piece is closed off during frying, it is difficult to remove the moisture by oil displacement in the inner portion of the snack piece. Higher moisture contents in the finished snack piece product can contribute to a harder texture.

Consequently, the need exists for a rolled snack piece having a light, crispy texture. Moreover, a need exists for the light, crispy texture to be substantially uniform throughout the cross-section of the rolled snack piece.

Several prior art solutions were tried in an attempt to satisfy this need. For example, one prior art solution for softening a fried dough involves using a potato or rice starch. When these starches are heated and fried at high moisture contents, the starch binds tightly to itself resulting in a glassy, hard texture. This glassy texture typically allows for rapid breakdown of the snack during mastication. Unfortunately, when potato or rice starch was added to the masa used in the rolled snack piece, the rolled snack pieces expanded radially inward, forcing the rolled snack piece to close up upon frying, and made the product bind so tightly that breakdown failed to occur during mastication. Thus, adding potato or rice starch, rather than resulting in a softer texture, resulted in a highly undesirably hard texture.

Other prior art softening compounds such as dextrins and lecithins failed to survive the frying process and resulted in excessive browning of the rolled snack pieces. Moreover, strong off flavors also became apparent. Fully hydrogenated, high melting vegetable oil (less than 5 iodine value) was also tried. Such oil provides voids in the food products creating less hardness, however, the hardstock leached directly into the oil due to its inability to complex with the starch in the masa. Moreover, oil quality was negatively impacted. Hence, a need exists for a method of making a fried, rolled snack piece having a light, crispy texture. The method should be conducive to cooking in hot oil, yet not severely impact oil quality. Moreover, the method should avoid excessive browning and off-flavors.

SUMMARY OF THE INVENTION

The proposed invention is a method for making a rolled snack food having a light, crispy texture. In one aspect, monoglyceride with a judicious choice of particle size distribution, is mixed with a starch-based dough. In another aspect, a particulate triglyceride is mixed with a starch-based dough followed by addition of a liquid monoglyceride.

The dough is formed into snack food pieces. In one embodiment, the snack food pieces are rolled, toasted, and fried in hot oil. It is theorized that the lipid-carbohydrate complex created from the starch amylose component helps to stabilize the starch and control inward expansion of the rolled snack piece during frying. By controlling inward expansion, the inner portion of the rolled snack piece can be permeated with hot oil, allowing more uniform cooking.

Hence, in one aspect, this invention produces a method that provides a bite-sized rolled snack food having a light, crispy texture. In addition, the invention provides a rolled snack food having a higher bulk density than prior art substantially flat snack food products thereby requiring less packaging. The above as well as additional features and advantages of the present invention will become apparent in the following written description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 3b is an alternative perspective representation of FIG. 3a.

DETAILED DESCRIPTION

Figure 1:
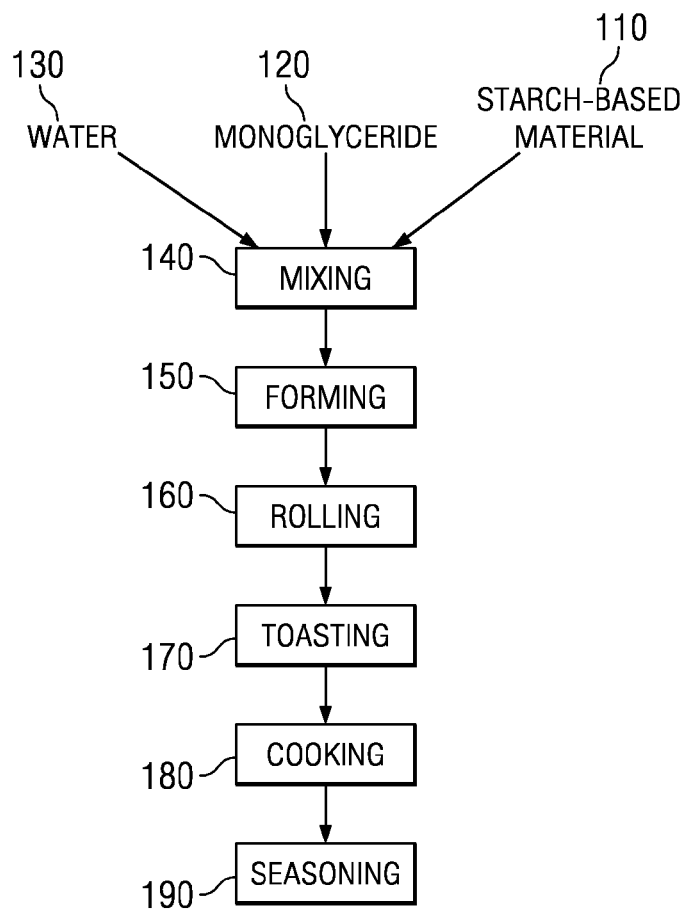
FIG. 1 is a schematic representation of one embodiment in the new process.

An embodiment of the innovative invention will now be described with reference to FIG. 1. FIG. 1 is a schematic representation of one embodiment in the new process. A starch based material 110, a monoglyceride 120, and water 130 are mixed 140 together in a continuous batch, or other mixer. The starch-based material can comprise corn masa made from a standard nixtalization process, a dry corn masa mix, potato flour, potato flakes, potato granules, corn flour, and mixtures thereof. However, any starch-based material comprising amylose including, but not limited to, corn, rice, tapioca, potato, and mixtures thereof can be used. In one embodiment, the starch-based material comprises about 40% to about 50% corn masa and the water comprises between about 45% to about 60% of the dough. As used herein, a monoglyceride is defined as a solid particulate monoglyceride having a reduced average particle size of less than about 400 microns and more preferably less than about 150 microns, and most preferably less than about 75 microns. Preferably, in one embodiment, the monoglyceride is added with only trace amounts of diglycerides and triglycerides. In one embodiment, the monoglyceride is a fully saturated (hydrogenated) monoglyceride. An example of an acceptable monoglyceride comprises Dimodan HS® 75 available from Danisco of New Century, Kans. In an alternative embodiment, the monoglyceride is partially hydrogenated.

Following mixing 140, the dough can be formed 150 into uncooked snack pieces. Forming 150 the dough can be achieved by compressing the dough between a pair of counter rotating sheeter/cutter rollers that are located closely together, thereby providing a pinch point through which the dough is formed into sheets and cut into a desired chip shape. The dough can be cut into any desired shape including, but not limited to, circles, triangles, squares, rectangles, pentagons, and hexagons or any other polygon. In an alternative embodiment, forming of the dough comprises extruding the dough and cutting the extruded dough into a desired shape. After the dough has been cut into a plurality of uncooked snack pieces, the dough pieces are rolled 160 by using known methods in the prior art. (see U.S. Pat. No. 6,393,974)

Figure 2:
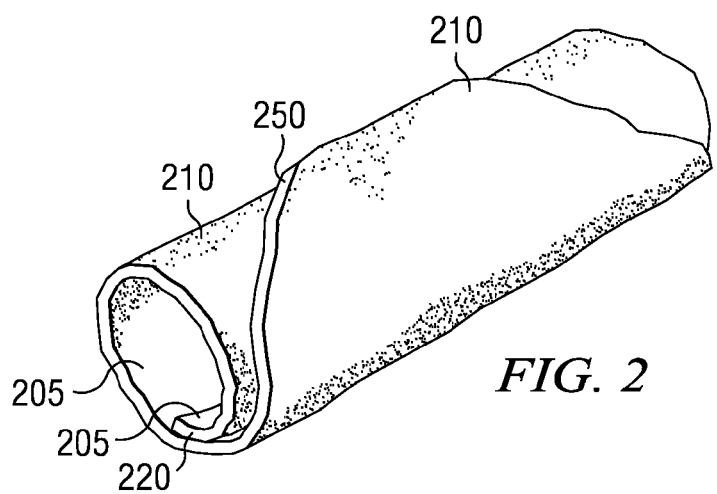
FIG. 2 is a perspective schematic representation of one embodiment of the rolled snack piece of the present invention.

FIG. 2 is a perspective schematic representation of one embodiment of the rolled snack piece of the present invention. The rolled snack piece comprises an inner facing surface 205 and an outer facing surface 210. The rolled snack piece is in the shape of a spiral having an overlap area. As used herein, an overlap area is created when at least a portion of the inner facing surface 205 is adjacent to at least a portion of the outer facing surface 210. The snack piece can be rolled into a spiral having an overlap area of varying lengths.

In the embodiment shown, the dough is rolled about one and one-half full turns. Although the inner portion 220 and outer portion 250 can substantially mate together in the overlap area, it can be desirable to have a gap (not shown) in the overlap area between the inner portion 220 and outer portion 250 to allow for expansion and oil contact during frying.

The rolled snack piece can also have varying inside and outside diameter ratios. As used herein, an inner diameter or inside diameter is defined as the average distance between opposing inner facing surfaces. As used herein, the outer diameter or outside diameter is defined as the average distance between opposing outer surfaces. In the embodiment shown, the rolled snack piece has an inner diameter of between about 0.125 inches and about 0.30 inches and an outer diameter of between about 0.25 inches and about 0.50 inches. It should be noted that the snack piece can be rolled into a spiral having a plurality of turns and the inside and outside diameters can be changed accordingly.

Referring back to FIG. 1, the rolled pieces are then cooked 180 to make a plurality of cooked rolled snack pieces. In one embodiment, cooking 180 comprises first toasting 170 the rolled snack pieces in a triple pass toast oven for about 30 to about 120 seconds at about 450° F. to about 750° F. In this embodiment, the toasted 170 rolled snack pieces are then fried 180 in hot oil. In an alternative embodiment, rolled snack pieces are sent directly to the fryer for cooking 180. Following cooking 180, the rolled snack pieces, in one embodiment, comprise a moisture content of between about 0.8% and about 2.0%.

The rolled snack pieces can be seasoned 190 in a tumbler, topping unit, or other seasoning device known to those in the art. In one embodiment, following cooking, the cooked, rolled snack piece comprises between about 0.05% to about 3.0% monoglyceride, about 25% to about 34% oil, about 0.8% to about 2.0% moisture, about 60% to about 80% of a starch-based component, and about 0% to about 8% seasoning.

It has been surprisingly found that the addition of monoglyceride having a reduced average particle size of less than about 400 microns, more preferably less than about 150 microns and most preferably less than about 75 microns provides for a substantially uniform light, crispy texture throughout the cross section of the cooked, rolled snack pieces. Without being limited to any specific theory, there are three theories as to why monoglyceride addition achieves this purpose. It is believed that these three theories either independently or in tandem explain the way in which the monoglyceride functions.

One theory is that the monoglyceride functions to inhibit inward expansion of the starch based material during frying. Starch is typically made up of amylose and amylopectin molecules. Amylose, primarily consisting of α-1,4 linked glucose rings is a straight chain helical molecule. Amylopectin, on the other hand, is a highly branched molecule that comprises both α-1,4 and α-1,6 linked glucose rings. It is theorized that the amylose helix collapses as a result of expansion that occurs during frying. Voids formed during frying near outer surfaces create inward expansion forces and cause the amylose helix near inner less-exposed surfaces to collapse.

Figure 3B:
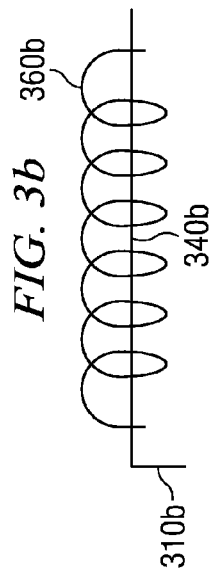
Figure 3A:
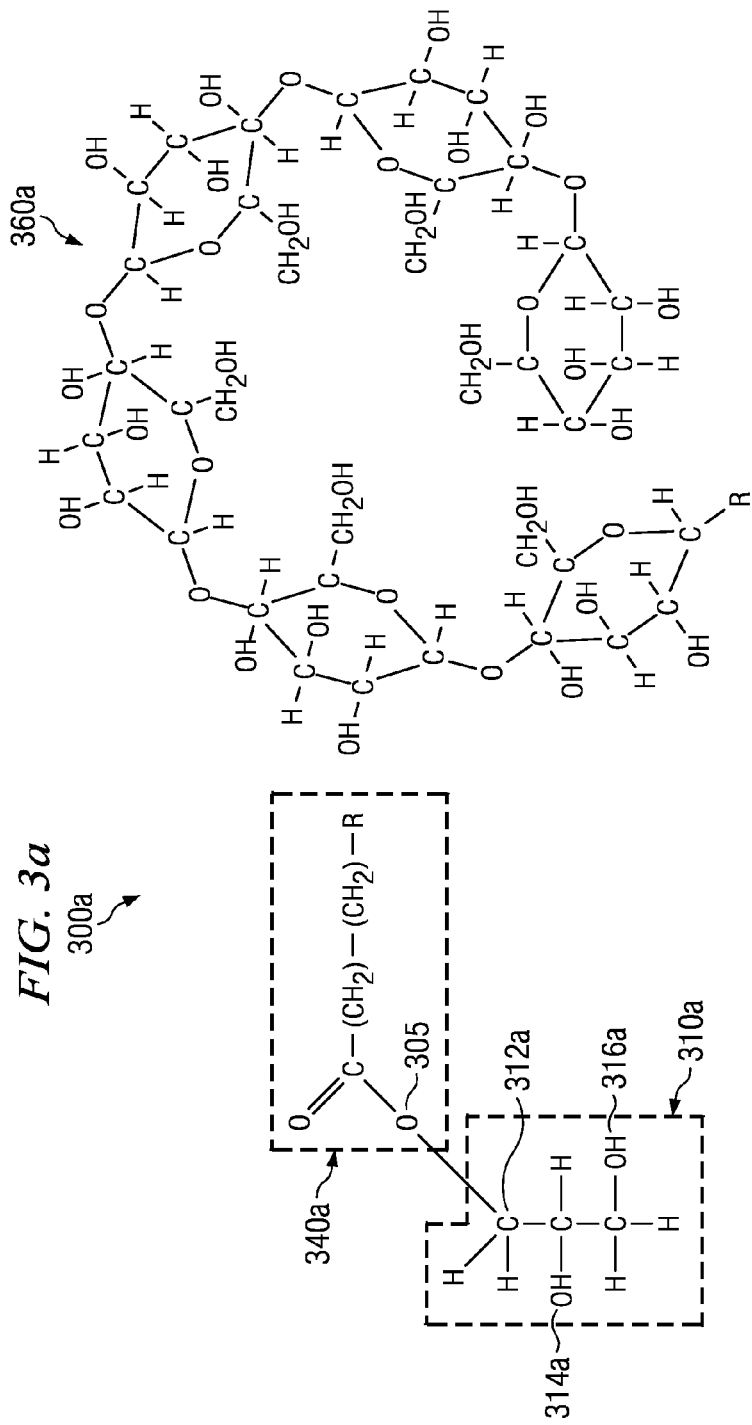
FIG. 3a is an illustration of the chemical structure of a monoglyceride and an amylose helix complex.

FIG. 3a depicts an illustration of a monoglyceride 300a and an amylose helix 360a. A monoglyceride 300a typically comprises a glycerol 310a and a fatty acid chain 340a. A diglyceride would have a fatty acid chain attached to the oxygen adjacent to second carbon atom 314a of the glycerol molecule 310a, or attached to the third glycerol carbon 316a. Similarly a triglyceride would have a fatty acid chains attached to each of the oxygens attached to the second and third glycerol carbons 314a 316a.

FIG. 3b is an alternative perspective representation of FIG. 3a. As shown in FIG. 3b, an amylose molecule 360b forms a single helix. It is believed that a lipid-carbohydrate complex is formed when the monoglycerides long hydrophobic fatty acid chain 340b is inserted into the amylose starch helix 360b. It is believed that the fatty acid chain 340b of the starch monoglyceride complex effectively builds bridges of support inside the amylose helix 360b. This bridging may prevent the amylose starch from collapsing due to inward expansion forces during frying. Therefore, the monoglyceride is contributing to the structural integrity of the masa or other starch-based material matrix by forming a lipid-carbohydrate complex. A hydrogenated monoglyceride has a better chance to complex due to the linear nature of the molecule. Unsaturated fatty acid molecules especially those having a cis configuration, can have kinks that lower their ability to complex with the linear form of the amylose helix. Thus, in an embodiment comprising a partially hydrogenated monoglyceride, a trans rather than a cis configuration at the double bond is preferred to permit a better interaction with the starch.

Particulate diglycerides and triglycerides may work, but are less desirable because they are not as effective as the monoglyceride. Hence, using an emulsifier having significant amounts of particulate glycerides other than monoglyceride lowers efficiency and results in increased costs. In sum, blends of monoglycerides with other glycerides can be used, but may be less desirable.

Similarly, other emulsifiers can be used including, but not limited, lysolecithin (lysophosphatidyl choline powder), succinic acid esters of monoglyceride, diacetlylated tartaric acid esters of monoglyceride (DATEM), stearoyl lactylate, and its salts (stearoyl 2-lactylate, sodium stearoyl 2-lacylate, calcium 2-lactylate).

The second theory is that monoglyceride "lubricates" the dough. The lubrication takes place both within the dough (intra-lubrication) and outside the dough (inter-lubrication). The inter-lubrication allows for better release from the roller and from the cutter. Further, the inter-lubrication may provide a small gap in the overlap area that allows for better oil contact within the overlap area during frying. Further, the inter-lubrication provided by the monoglyceride also prevents the rolled dough piece from sticking to itself in some portions at the overlap area, allowing oil in the fryer to contact the dough piece in the overlap area.

Intra-lubrication may be the result of the melted monoglyceride formed in the toast oven. The melted monoglyceride may create a series of voids throughout the rolled dough piece. These voids provide an area for steam to be created when the dough is fried. The steam can then escape permitting oil to enter these voids.

The third theory is that monoglyceride changes the thermal transfer properties of the dough. Addition of the monoglyceride may impact the rate in which water leaves the starch during frying, or affect the amount of unbound or free water that exits the starch-based dough during frying. For example, the monoglyceride interaction may displace free water from the starch and the polar end of the monoglyceride will be more likely to hold the bound water in the system. Thus, rate of moisture removal and final amount of moisture in the fried chip can be affected by the monoglyceride. The longer dough is fried, the harder it becomes. A shorter fry dwell time results in a more tender, less hard chip. Prior to adding the monoglyceride to the rolled dough, a fry dwell time of three minutes in oil at 360° F. was required to achieve a chip having a moisture content of less than 2% by weight. Addition of the monoglyceride reduced the dwell time to about one minute. Thus, a chip having a light, crispy texture resulted.

The amount of monoglyceride used in the dough is one variable of the invention that must be controlled for a number of reasons. First, monoglyceride is not very elastic. Thus, dough rolling becomes more difficult when the monoglyceride is used at higher levels. For example, if high levels (e.g. more than about 3% by finished product weight) of monoglyceride are used, the dough, after it is sheeted and cut, can retain shape memory. As a result, rolled uncooked snack pieces have a tendency to unroll as higher amounts of monoglyceride are used. Second, the melting temperature of monoglyceride powder is about 150° F. In one embodiment, the toast oven is operated at over 450° F. Thus, if too much monoglyceride is used, it has a tendency to melt and cause rolled dough piece to unroll in the toast oven. Moreover, if a particle size of monoglyceride above 400 microns is used, distribution throughout the dough can be impacted. This can result in monoglyceride beading out of the dough and onto the belt in the toast oven. As a result, there may be a shortage of monoglyceride when needed in the fryer to control expansion, provide for lubrication, or impact the thermal transfer properties of the dough. Third, using high levels of monoglyceride increases the cost of snack product production. Fourth, high levels of monoglyceride can alter the texture or even the taste of a finished product. For example, high concentrations of monoglycerides are known to give an oily mouth feel and off flavors. Moreover, as discussed above, monoglycerides tend to lubricate the dough and allow more moisture to escape during frying. Too much moisture escape during frying results in reduced blistering of the chip surface. Less blistering results in a harder texture and less desirable look in a tortilla chip embodiment. Moreover, the resulting fried chip would have an oil soaked appearance. Fifth, a high level of monoglyceride can result in monoglyceride leaching into the oil, affecting oil quality. Thus, any addition of monoglyceride must proceed with caution.

As discussed above, there are numerous disadvantages associated with increased levels of monoglyceride. Many of these disadvantages, however, are greatly reduced or not apparent when using lower concentrations of monoglyceride. It has surprisingly been found that a lower concentration of monoglyceride can contribute to sufficient structural integrity of the starch-based material if the average particle size of the monoglyceride is at or below about 400 microns, more preferably below about 150 microns and most preferably at or below about 75 microns. Using 400 micron monoglyceride required a monoglyceride of 2.3% by weight of the finished product to soften the snack pieces to desired levels. A monoglyceride having an average particle size of less than about 150 microns and more preferably less than about 75 microns provides monoglyceride having an increased surface area, allowing even lower levels of monoglyceride to be used. Moreover, better mixing of the monoglyceride throughout the dough matrix can occur, increasing the monoglyceride availability to the starch molecule.

Thus, a monoglyceride concentration of less than about 3%, more preferably less than about 1%, and most preferably between about 0.15% and about 0.75% by weight of finished product can be used with monoglycerides having smaller particle sizes. Hence, in one aspect, the present invention provides a method for making a rolled snack food having a light and crispy texture. By using a lower concentration of monoglyceride as disclosed in the present invention, a rolled snack piece does not have the tendency to unroll in the toast oven, undesirable texture and off-flavors are minimized, and the cost of producing the rolled snack piece can be reduced. Moreover, oil quality is not substantially impacted.

In another aspect of the invention and referring to FIG. 1, it is believed that a particulate triglyceride can be used in place of the solid particulate monoglyceride 120. As used herein, a particulate triglyceride is defined as a triglyceride having a reduced average particle size of less than about 400 microns and more preferably less than about 150 microns, and most preferably less than about 75 microns. A liquid monoglyceride could then be applied, for example by a spray, to the dough during mixing 140 to produce similar textural effects in a rolled snack piece. For example, it is believed that the overall functionality (expansion control, lubrication, thermal transfer properties) can be enhanced in this manner. For example, both the particulate triglyceride and liquid monoglyceride provide lubrication. In one embodiment, a particulate monoglyceride is used. The particulate triglyceride may provide better void space functionality and liquid monoglyceride provides better starch interaction that results in expansion control. Thus, the texture of the snack piece can be controlled by changing the particulate size and/or concentration of the triglyceride, while keeping the starch interaction constant, and vice-versa. Such optimization may be more difficult with only monoglyceride. The liquid monoglyceride and particulate triglyceride added should be less than 3% by weight of the finished product.

While this invention has been particularly shown and described with reference to a preferred embodiment, it will be understood by those skilled in the art the various changes in form and detail may be made therein without departing from the spirit and scope of the invention.

What is claimed is:

1. A method for making cooked rolled snack pieces, said method comprising the steps of:
   a. mixing a starch-based material comprising amylose with a particulate triglyceride and a liquid or particulate monoglyceride and water to form a starch based dough, wherein said starch-based material consists of about 40% to about 50% corn masa and further wherein said water comprises between about 45% to about 60% of said dough;
   b. forming said starch based dough into a plurality of uncooked snack pieces;
   c. rolling said uncooked snack pieces to make a plurality of rolled snack pieces, wherein each rolled snack piece further comprises:
   an inner facing surface;
   an outer facing surface;
   wherein at least a portion of said inner facing surface is adjacent to at least a portion of said outer facing surface and thereby forms an overlap area; and
   d. cooking said rolled pieces to make a plurality of cooked rolled snack pieces having the overlap area.

2. The method of claim 1 wherein said starch-based material at step a) comprises at least about 40% amylose by weight.

3. The method of claim 1 wherein said liquid monoglyceride and said triglyceride at step a) comprises between about 0.15% and about 3% by weight of said cooked rolled snack pieces.

4. The method of claim 1 wherein said particulate triglyceride at step a) comprises a powder having an average particle size less than about 150 microns.

5. The method of claim 1 wherein said monoglyceride at step a) comprises a fatty acid chain having at least 8 carbons.

6. The method of claim 1 wherein said mixing at step a) forms a lipid-carbohydrate complex.

7. The method of claim 1 wherein said forming at step b) comprises sheeting and cutting said starch based dough.

8. The method of claim 1 wherein said forming at step b) comprises extruding and cutting said starch based dough.

9. The method of claim 1 wherein said forming at step b) comprises cutting said starch-based dough into a shape having at least 3 sides.

10. The method of claim 1 wherein said b) comprises cutting said starch-based dough into a hexagonal shape.

11. The method of claim 1 wherein said rolling at step c) comprises between one and two full turns.

12. The method of claim 1 wherein said outer facing surface and said inner facing surface substantially mate together in said overlap area.

13. The method of claim 1 wherein said rolling at step c) creates an inner diameter of between about 0.125 inches and about 0.30 inches.

14. The method of claim 1 wherein said rolling at step c) creates an outer diameter of between about 0.25 inches and about 0.50 inches.

15. The method of claim 1 wherein said cooking at step d) comprises toasting.

16. The method of claim 1 wherein said cooking at step d) comprises toasting followed by frying.

17. The method of claim 1 wherein said cooking at step d) comprises frying.

18. The method of claim 1 wherein said uncooked snack chips are fried in oil at between about 300° F. and about 400° F.

19. The method of claim 1 wherein said cooked rolled snack pieces after step d) comprise:
   about 0.05% to about 3.0% by weight particulate triglyceride and liquid monoglyceride;
   about 25% to about 34% by weight oil;
   about 0.8% to about 2.0% by weight moisture;
   about 60% to about 80% by weight starch-based component; and
   about 0% to about 8% by weight seasoning.

20. A snack piece made by the method of claim 1.

21. A method for making cooked rolled snack pieces, said method comprising the steps of:
   mixing a starch-based material comprising amylose with a particulate triglyceride and water to form a starch based dough, wherein said starch-based material consists of about 40% to about 50% corn masa and further wherein said water comprises between about 45% to about 60% of said dough;

applying a liquid or particulate monoglyceride to said dough during mixing;

forming said starch based dough into a plurality of uncooked snack pieces;

rolling said uncooked snack pieces to make a plurality of rolled snack pieces, wherein each rolled snack piece further comprises:

an inner facing surface;

an outer facing surface;

wherein at least a portion of said inner facing surface is adjacent to at least a portion of said outer facing surface and thereby forms an overlap area; and cooking said rolled pieces to make a plurality of cooked rolled snack pieces, wherein said liquid monoglyceride and said particulate triglyceride comprise less than 3% by weight of the cooked rolled snack pieces.

* * * * *